United States Patent

[11] 3,563,460

| | | | |
|---|---|---|---|
| [72] | Inventor | Philip L. Nine | |
| | | Indianapolis, Ind. | |
| [21] | Appl. No. | 770,702 | |
| [22] | Filed | Oct. 25, 1968 | |
| [45] | Patented | Feb. 16, 1971 | |
| [73] | Assignee | Curtis Dyne-Products Corporation | |
| | | Wistfield, Ind. | |
| | | a corporation of Ohio | |

[54] GRAIN BIN AERATION CONTROL
7 Claims, 4 Drawing Figs.
[52] U.S. Cl.................................................. 236/49,
34/54, 98/55, 236/78, 307/243, 317/153
[51] Int. Cl................................................... G05d 23/34,
G05d 7/06
[50] Field of Search........................................... 98/55;
236/49, 78B, 78A; 307/310, 243; 317/148.5, 153;
328/208; 323/75; 34/54

[56] References Cited
UNITED STATES PATENTS

| | | | | |
|---|---|---|---|---|
| 2,625,458 | 1/1953 | Ruhland...................... | | 317/153X |
| 2,655,734 | 10/1953 | Ohlheiser..................... | | 34/54 |
| 2,767,484 | 3/1954 | Gilson.......................... | | 34/54 |
| 3,100,145 | 8/1963 | Moore.......................... | | 34/54X |
| 3,117,311 | 1/1964 | Lemaire....................... | | 317/153X |
| 3,161,782 | 12/1964 | Vieth............................ | | 236/78X |
| 3,377,545 | 4/1968 | Tveit............................ | | 236/78X |

Primary Examiner—William E. Wayner
Attorney—Woodard, Weikart, Emhardt & Naughton ABSTRACT: A weather-proof housing on the exterior of a grain bin has a socket receiving the plug of an aeration fan under the bin. Temperature sensing probes, each including a thermistor, are disposed at spaced locations in the bin. Bridge circuits in the housing share a manual variable temperature setting resistor, each circuit having a thermistor therein. Unbalance detector transistors are provided for each bridge circuit and responsive to a sensed temperature change beyond a predetermined range to operate a relay to connect 110 volt, 60 cycle per second (Hz) power to the socket to energize the fan.

INVENTOR.
PHILIP L. NINE

BY
Woodward, Weikart, Emhardt & Naughton
ATTORNEYS

GRAIN BIN AERATION CONTROL

BACKGROUND OF THE INVENTION

1. Field of the Invention

This invention relates generally to electronic controls, and more particularly to grain bin aeration controls.

2. Description of the Prior Art

After drying to a certain desired range of moisture content, various grains are stored in large corrugated metal bins holding 5,000 bushels, for example. In order to avoid spoilage, it is desirable to control the temperature in such bins and for this purpose, it is common to employ an aeration fan below a false bottom in such a bin, to move air downwardly or upwardly through the grain and discharge it out of the bin. In order to avoid trouble from mildew and insects, it is desirable to keep the temperature of the grain between 35° and 70° degrees F. and preferably near the outside ambient temperature.

Prior art practice has involved the use of manual switches to turn on aeration fans from time-to-time when some need for cooling is indicated by visual or manual observation of the bin contents. Another approach is to use a probe with a meter on it for temperature indication, manually operate the aeration fan switch as needed depending upon meter indications. It is believed that another type of control has been used which responds to temperature rise in the grain to start the aeration fan, but does not lend is itself to adjustment of response temperature according to ambient temperature changes.

The present invention is directed toward overcoming the disadvantages and shortcomings of the prior art practices, and is intended to facilitate the maintenance of grain temperatures reasonably near average seasonal ambient temperature within a desired range of ambient temperatures.

SUMMARY OF THE INVENTION

Described briefly, in a typical embodiment of the present invention, an aeration control includes a thermistor in a probe disposed in the grain in a bin, the thermistor being a portion of a bridge circuit having manually adjustable resistor in another arm thereof, bridge unbalance being detected by one or the other of a pair of transistors, depending upon polarity of unbalance, with the transistor output operating a relay to provide power line energy to an aeration fan.

BRIEF DESCRIPTION OF THE DRAWINGS

The full nature of the invention will be understood from the accompanying drawings and the following description and claims.

DESCRIPTION OF THE PREFERRED EMBODIMENT

Figures 1, 2, 3:
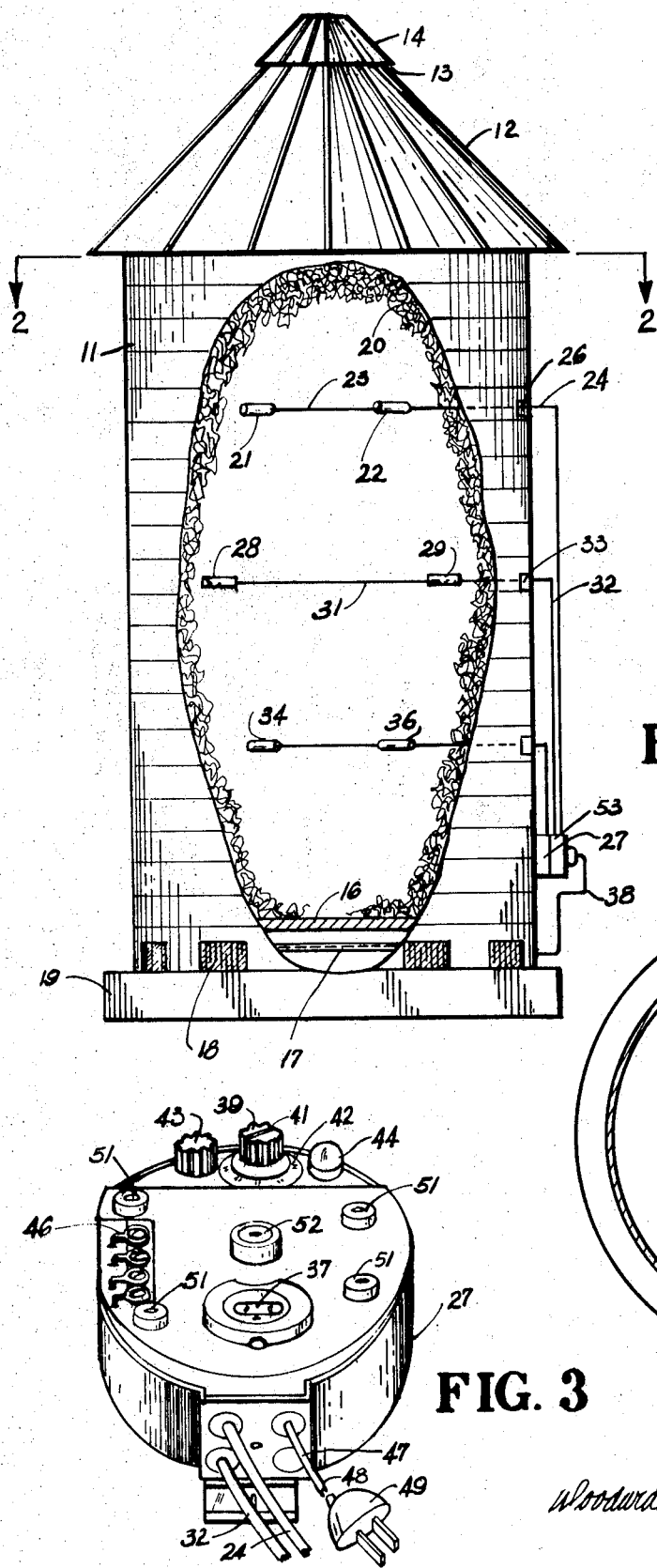
FIG. 1 is an elevational view, partially cut away, showing a grain bin incorporating a typical embodiment of the present invention.
FIG. 2 is a cross section at line 2-2 in FIG. 1 and viewed in the direction of the arrows.
FIG. 3 is an enlarged pictorial view of he the control housing with cover removed.

Referring now to the drawings in detail, and particularly FIGS. 1 and 2, the grain bin 11 is cylindrical in shape and typically made of corrugated metal. The cover 12 is conical and an air inlet annulus 13 is provided under the cap 14. A false bottom is provided at 16 and an aeration fan is provided at 17. This, fan, when operating, draws air into the bin through the annulus 13 and exhausts it through ports 18 or other outlet means adjacent the bottom 19 of the bin. The grain 20 extends from near the top of the bin to the false bottom, although a portion of it is omitted from the drawing in order to better show interior details of the recommended arrangement of the temperature sensing probes.

In the illustrated embodiment, for the purpose of sensing temperature at various locations in the grain, three sets of probes are employed. The first set includes the probes 21 and 22 spaced approximately 6 feed apart along the cable 23, a cable 24 extending from the probe 22 through the aperture 26 in the wall of the bin and into the control housing 27 mounted on the exterior wall of the bin. Each of these probes includes a brass case having a thermistor (temperature sensitive resistor) therein, the thermistor being potted in epoxy and responsive to increases in the case temperature by an decrease of resistance, and responsive to decrease of case temperature by an increase of resistance. The thermistor in probe 21 is in a circuit separate from the thermistor in probe 22, although a single cable 23 provides a mechanical and conductor shielding connection between the two.

In addition to the two probes 21 and 22, probes 28 and 29 are provided on cable 31 and a cable 32 from probe 29 passes through the aperture 33 in the bin wall and extends into the housing 27. Similarly the probes 34 and 36 are connected together and to the housing 27.

FIG. 2 shows the relationship of these probes in a plan view, so it is seen that considering vertical planes through the bin, each of three equally spaced planes contains two probes therein. More or less probes can be used, as desired.

Referring now to FIG. 3, the housing is shown in more detail and includes a receptacle or socket 37 to receive a plug of the cord 38 connected to the aeration fan 17 (FIG. 1). It also includes a temperature adjustment knob 39 having a screw driver slot 41 therein and an appropriate dial 42 associated therewith. A fuse cover 43 is provided as is an indicator lamp 44.

A terminal block is provided at 46 with appropriate leads from the probe cord 32. Likewise leads from the probe cord 24 are connected to certain of the terminals for a purpose which will be described hereinafter. A rubber plug 49 is provided in an additional aperture in the bottom wall of the housing for the probe cord from the third set shown in FIGS. 1 and 2.

A cord 48 is shown entering the housing and this is connected to a line plug 49 to energize the unit from an exterior source. Several internally threaded bosses 51 are provided for mounting internal components, and a central threaded boss 52 is provided to receive a mounting screw for a cover 53.

Figure 4:
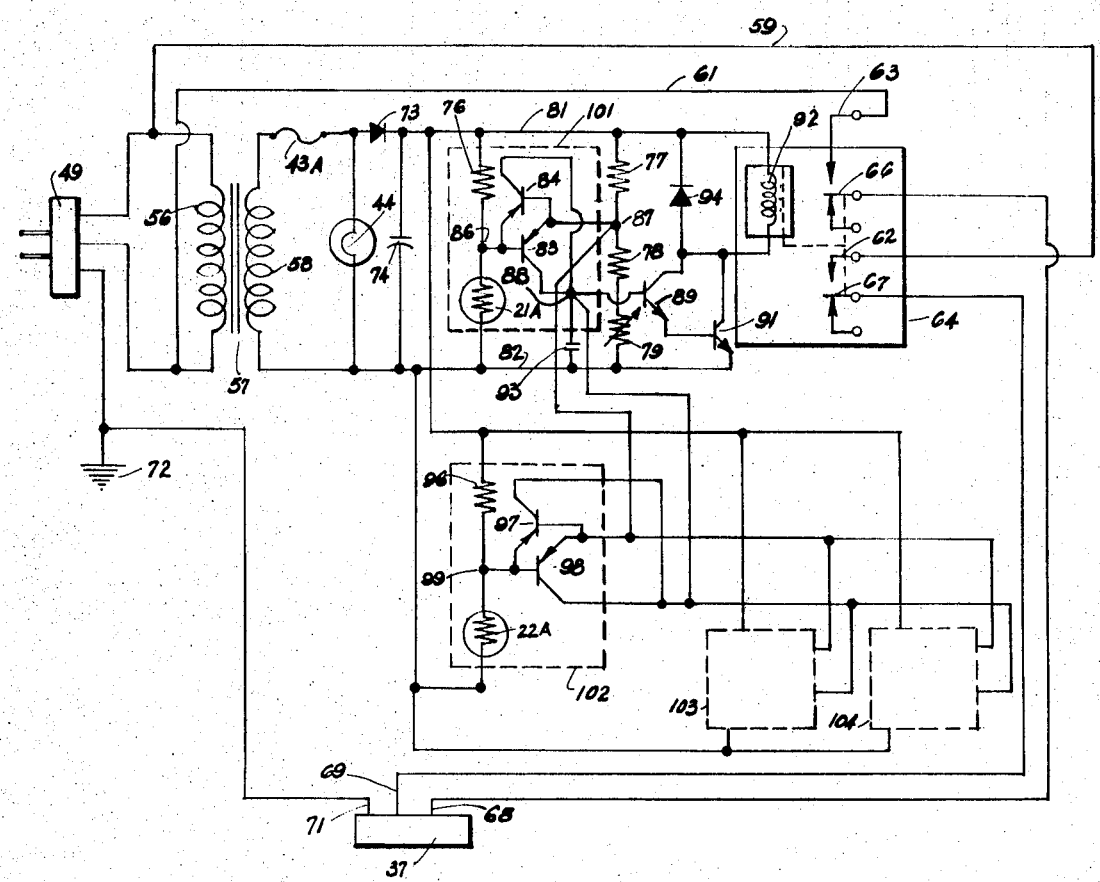
FIG. 4 is a schematic diagram of the circuitry employed according to a typical embodiment of the invention.

Referring now to FIG. 4, the line plug 49 of FIG. 3 is shown at the left, and provides 110 volt, 60 cycle (Hz) alternating current to the primary winding 56 of the stepdown transformer 57. The secondary winding 58 thereof supplies power through the fuse 43A across a pilot light 44 indicating availability of power to the control circuitry. The 110 volt line power is also connected on conductors 59 and 61 to normally open contacts 62 and 63, respectively of relay 64. The movable contactors 66 and 67 of this real relay are connected to the active pins of the socket 37 at 68 and 69, respectively. The third pin of this socket is grounded through the conductor 71 to the common ground 72.

In addition to the stepdown transformer for voltage reduction, the power to the control circuitry is rectified by the half-wave rectifier 73, with capacitor 74 as a filter. A Wheatstone bridge circuit includes a first arm with the thermistor 21A therein, a second arm with a fixed resistor 76 therein, a third arm with a fixed resistor 77 therein and a fourth arm with the fixed resistor 78 and variable resistor 79 therein, the latter being connected to the knob 39 (FIG. 3) for adjusting the temperature setting. The direct current supply for this bridge is across the lines 81 and 82.

In order to detect bridge unbalance, two PNP transistors 83 and 84 are employed. The base of transistor 83 is connected to the junction 86 between thermistor 21A and fixed resistor 76. The emitter of transistor 83 is connected to the junction 87 between resistor 77 and resistor 78. Similarly the emitter of transistor 84 is connected to junction 86, and the base thereof is connected to the junction 87. Both of these transistors are normally off (quiescent) and one or the other of the transistors will burn on in case of sufficient bridge unbalance to forward bias the emitter-base junction. The polarity of the unbalance will determine which transistor is turned on. The collectors of the two transistors are connected together at junction 88 to provide a signal at this point, regardless of which transistor is turned on.

Two switching tan transistors 89 and 91 p are provided in a Darlington connection for rapid switching, the base electrode of transistor 89 being connected to the junction 88. The collectors of the two transistors are connected to the operating coil 92 of the relay 64. Transistors 89 and 91 are normally-off.

OPERATION

In the operation of the apparatus as thus far described, assume that the relay contacts are in the condition shown, and the aeration fan is off. Electrical energy is applied to the primary winding of the stepdown transformer, so the pilot light is on, showing availability of power to the control circuitry. As the temperature rises in the grain at the probe 21, the resistance of the thermistor 21A decreases, whereupon the voltage at junction 86 decreases. This results in a bridge unbalance and, when the voltage drop across the emitter-base junction of transistor 83 reaches the order to of 0.5 to 0.7 volts, this transistor turns on. The result is a rise in potential of the collector applied to the base of transistor 89 in the Darlington pair. The collector current of transistor 83 is filtered by the capacitor 93 to remove transient surges and is amplified by the transistor 89 and transistor 91, resulting in saturation of transistor 91. This energizes the relay coil and closes the normally open contacts 62 and 63 of the relay. 110 and volt, 60 Hz energy is thereby applied to the terminals 68 and 69 of the socket 37 to turn on the aeration fan.

As the fan cools the grain, the resistance in thermistor 21A will increase, causing a rise in potential at the junction 86 so that, when the bridge is again in balance, transistor 83 will be turned off, followed by the turning off of transistors 89 and 91. The diode 94 connected across the relay coil 92 prevents damaging voltage surges when the transistors 89 and 91 turn off.

If the temperature in the grain at the probe 21 should fall, perhaps due to moisture migration, the resistance of the thermistor 21A increases, whereupon the voltage at junction 86 increases. This results in bridge unbalance and, when the voltage drop across the emitter-base junction of transistor 84 reaches the order of 0.5 to 0.7 volts, the transistor turns on. The resulting collector current is amplified by the transistors 89 and 91 again activating the relay 92 and energizing the aeration fan.

It was mentioned above that it is desirable to keep the grain temperature near average seasonal ambient temperature within a range of 35° to 70° F. Therefore, as the ambient temperature average decreases during the fall months, it is desirable to reset the temperature control 39 about every two weeks, by about 5° F., if the average seasonal temperature drops about 10° F. per month during the fall. Accordingly the appropriate 5° indicator reading is made by turning the knob 39.

Reducing the temperature setting by knob 39 causes an increase in the resistance 79 in the bridge. This results in a forward bias of the emitter-base junction of transistor 83. The resulting collector current as the transistor is turned on is amplified by the transistors 89 and 91 again activating the relay 92 and energizing the aeration fan.

In the spring of the year, when the seasonal temperature average rises, it is desirable to maintain a similar increase in the temperature of the grain. Accordingly, a suitable adjustment is made time-to-time by the temperature setting knob 39. An increase setting thereof results in a decrease of the resistance 79, forward biasing the transistor 84 and when it turns on, the collector current thereof is amplified by transistors 89 and 91 to activate the relay and turn on the aeration fan for warming the grain. The purpose of keeping the grain temperature near the average mean or seasonal temperature, is to prevent moisture migration therein. However the grain should not be cooled below 35° because it is subject to freezing below that temperature. In the summer it should not be warmed above 70° F. because higher temperatures stimulate insect and fungi growth.

From the foregoing description, it should be apparent that the present invention provides an arrangement whereby the fan is automatically turned on when the grain temperature rises above a desired level and it is automatically turned off when the temperature is returned to the desired level. Also the control makes possible the manual activation of the fan as desired to maintain temperatures near ambient, in the grain, When the expression "manual" is used with reference to adjustments and the manually variable resistor 79, it should be understood that adjustments or variations in the resistance can be accomplished by remote control, electromechanically or otherwise, rather than by a direct connection between the knob 39 and the resistor 79. However the latter approach is considered the most expedient and economical approach.

From the foregoing description, it can also be appreciated that the fan can be turned on by turning the temperature control up a certain amount or down a certain amount, depending upon the temperature in the grain. The reason for this is the fact that the circuit is responsive to a bridge unbalance of either polarity, and one or the other of the transistors 83 and 84 will be activated, depending upon what the polarity is. The "dead space" between the high and low temperatures at which the fan will be turned on by the manual control, is determined by the base-emitter forward breakdown voltage of the detector transistors 83 and 84, and the temperature response characteristic of the thermistor. Typically a range 10° F. between these limits can be provided with transistors requiring approximately 0.5 volts emitter-base forward bias to turn them on.

It was mentioned above that more than one probe can be used. The way in which the circuit of the present invention lends itself particularly to the use of additional plug-in probe units will now be described.

Referring again to FIG. 4, the thermistor 22A is shown in series with resistor 96 and this series combination is connected across the conductors 81 and 82. Thermistor 22A corresponds to that in the probe 22 of FIG. 1. Detector transistors 97 and 98 are connected to the junction 99 in the same way as transistors 84 and 83 are connected to the junction 86. The emitter of transistors 98 and the base of transistor 97 are connected to the junction 87 which is the reference potential for transistors 83 and 84.

It was mentioned before that the thermistor 21A and resistors 76, 77, 78 and 79 form a Wheatstone bridge. It might now be recognized that thermistor 22A and resistor 96, along with resistors 77, 78 and 79, also form a Wheatstone bridge. Accordingly, FIG. 4 shows two Wheatstone bridges which have three resistances in common including the temperature adjustment resistance and the reference potential junction 87. Since the detector transistor combination for the bridge including the thermistor 22A is of the same type as that for the bridge including thermistor 21A, an unbalance in either of the bridges will produce an output at the junction 88 which can be amplified by the Darlington pair and activates the relay. Accordingly, if either of the probes senses a temperature that is outside the desired range, the aeration fan will be energized.

The additional probes shown in FIGS. 1 and 2 can be connected to the circuitry including the junctions 87 and 88 of FIG. 4 in the same manner as described with reference to the probe 22. Simple plug-in connections can be provided in the housing for this purpose as indicated in FIG. 3. In this manner, control of the temperature generally throughout the grain can be maintained readily by the apparatus of the present invention.

In FIG. 4, the portions of the two bridges which have been discussed herein and which are not in common to each other, as well as the unbalance detectors therefor are shown in dotted outlines 101 and 102. Additional dotted blockout lines are shown at 103 and 104 representing portions of additional bridges for the probes 28 and 29, for example, both of which bridges share the components 77, 78 and 79. Accordingly, leads are shown extending from the blocks 103 and 104 to the corresponding leads from the blocks 101 and 102 to the appropriate junctions.

Although many conventional bins do not have the cap 14, annulus 13, and ports 18, the present invention can be readily employed by opening a manhole or fill cap at the top and locating the exhaust fan in a single exhaust port in the bottom of the bin. Another alternative is to provide a plenum chamber under the bin, attach a blower to it, and push air thereby up through the bin and out the top.

Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

I claim:

1. Grain bin aeration control apparatus comprising:
temperature sensor means positionable in a bin for exposure to the temperature therein;
an air mover;
control circuit means having input means for a source of electrical energy and output means connected to said air mover and including switching means;
said temperature sensor means including a plurality of temperature responsive resistors positionable at various locations in a bin;
said control circuit means including a plurality of bridges, each bridge of said plurality having one of said resistors in an arm thereof;
said control circuit means including a plurality of unbalance detector means, each detector means of said plurality being connected to one of said bridges of said plurality; and
said switching means being coupled to all of said detector means and operable by each of said detector means upon detection of an unbalanced condition in its respective bridge to couple said source to said air mover.

2. The apparatus of claim 1 wherein; each of said bridges has two arms in common, with a variable resistor in one said arms to establish a reference voltage for all of said bridges, said variable resistor being manually variable to establish the level of said reference voltage as desired to correspond to a temperature level sought at said sensor means.

3. The apparatus of claim 2 wherein each of said unbalance detector means includes:
a first normally-quiescent transistor having its control circuit path connected across a series combination of the temperature responsive resistor of its respective bridge and the said variable resistor and oriented to become conductive upon occurrence of a voltage drop of a predetermined amount in one polarity across said combination;
a second normally-quiescent transistor having its control circuit path connected across the said series combination and oriented to become conductive upon occurrence of a voltage drop of a predetermined amount in an opposite polarity across said combination; and
the total range of the two of said voltage drops being selected to correspond to the desired range between the high and low temperatures sensed by said temperature responsive resistors at which air mover operation is desired for any one setting of said variable resistor.

4. The apparatus of claim 3 wherein; each of said transistors of said pair requires between 0.45 and 0.8 volts base-emitter forward bias to be switched from a quiescent state to a conducting state.

5. The apparatus of claim 1 wherein:
said sensor means include probes insertable separately through walls of a bin, each probe having one of said temperature responsive resistors therein and a cable coupled therefrom to the exterior of the bin;
said apparatus including a housing mountable on the bin, said housing having a socket portion of said output means therein receiving a plug connected to said air mover, said socket portion being coupled to said input means by said switching means upon operation of said switching means for energization of said air mover; and
said probe cables being plugged into said housing for connection to arms of their respective bridges inside said housing.

6. Grain bin aeration control apparatus comprising:
temperature sensor means positionable in a bin for exposure to the temperature therein;
an air mover;
control circuit means having input means for a source of electrical energy, and output means connected to said air mover, said control circuit means including portion of said sensor means and responsive to a temperature change of a predetermined amount at said sensor means portion to couple said source to said air mover;
said circuit means including, a first bridge having a first arm with a temperature responsive resistance (21A) therein, a second arm with a first resistance (76) therein, a third arm with a second resistance (77) therein, and a fourth arm with an adjustable resistance (78,79) therein;
first solid state switch means (83) having a control circuit coupled to the junction (86) between said temperature responsive resistance and said first resistance and to the junction (87) between said second resistance and said adjustable resistance, said switch means being switchable in response to a predetermined amount of unbalance in said bridge,
said output means including electrically operable line switch means (66,67) having control means (92) coupled to said solid state switch means (83) and operable thereby, said circuit means further including a second bridge having a first arm with another temperature responsive resistance (22A) therein, a second arm with another resistance (96) therein, a third arm in common with said third arm of said first bridge and, a fourth arm in common with said fourth arm of said first bridge;
second solid state switch means (20) having a control circuit coupled to a junction (99) between said another temperature responsive resistance and said another resistance of said second arm of said second bridge, and to the junction (87) between said third and fourth arms of said first bridge;
said second control means being switchable in response to a predetermined amount of unbalance in said bridge, and
said control means (92) of said line switch means being coupled to said second solid state switch means (20) and operable thereby.

7. The apparatus of claim 6 and further comprising:
additional bridges, each having first and second arms with temperature responsive resistances and other resistances, respectively, therein and each having third and fourth arms in common with the third and fourth arms, respectively, of said first bridge;
additional solid state switch means corresponding in number to the number of additional bridges, each additional solid state switch means having a control circuit coupled to the junction between the first and second arm of its respective bridge and to the junction between said third and fourth arms of said first bridge.

UNITED STATES PATENT OFFICE
CERTIFICATE OF CORRECTION

Patent No. 3,563,460                   Dated February 16, 1971

Inventor(s) Philip L. Nine

It is certified that error appears in the above-identified patent and that said Letters Patent are hereby corrected as shown below:

Column 2, line 51, "of this real relay" should be
--of this relay--

Column 2, line 74, "transistors will burn on" should be
--transistors will turn on--

Column 3, line 5, "Two switching tan transistors" should be
--Two switching transistors--

Column 3, line 5, "91 p are" should be --91 are--

Column 3, line 17, "one, showing" should be --on, showing--

Column 3, line 31, "and volt," should be --volt,--

Column 6, line 52, "said second control means" should be
--said second switch means--

Signed and sealed this 13th day of July 1971.

(SEAL)
Attest:

EDWARD M. FLETCHER, JR.                WILLIAM E. SCHUYLER, JR.
Attesting Officer                      Commissioner of Patents